United States Patent Office 3,441,213
Patented Apr. 29, 1969

3,441,213
PNEUMATIC AIR TEMPERATURE CONTROL SYSTEM
Charles Anthony Maher, Jr., Wakefield, Mass., assignor to United Aircraft Corporation, East Hartford, Conn., a corporation of Delaware
Filed Jan. 23, 1968, Ser. No. 699,861
Int. Cl. G05d 11/02
U.S. Cl. 236—13     2 Claims

ABSTRACT OF THE DISCLOSURE

In a pneumatic temperature control system, means are provided for biasing a valve-operating, pressure responsive servo actuator with an artificial ambient pressure so that the pressure responsive servo actuator responds to the pressure differential existent between the servo pressure and the artificial ambient pressure, and between the pressure of the source of servo fluid and the artificial ambient pressure.

BACKGROUND OF THE INVENTION

*Field of the invention*

This invention relates to a pneumatic temperature control system for controlling temperature of a fluid in a duct and is an improvement to the temperature control system described and claimed in application No. 699,865 of Edward W. Radtke, filed Jan. 23, 1968 and assigned to the assignee.

*Description of the prior art*

FIG. 1 depicts a pneumatic temperature control system as improved according to the invention taught by the above-mentioned application of Edward W. Radtke. It is seen that air at temperature $T_1$ is mixed with air at temperature $T_2$ in duct 2 to obtain air at temperature $T_3$. The valve 4 in duct 6 is modulated by a pressure responsive servo actuator 8 of the half-area type. It is seen that the servo pressure $P_s$ which provides the force for modulating the valve 4 is dependent upon the pressure of the source of servo fluid $P_1$, artificial ambient pressure $P_2$, which is maintained in the chamber 10 surrounding the variable area orifice 12 such that the ratio of $P_1/P_2$ is constant upon the area of fixed orifice 20, and upon area $A_{12}$, which is dependent upon the temperature $T_3$ sensed by the temperature sensor 14 whose case expands with an increase in temperature $T_3$, increasing the area $A_{12}$ of variable area orifice 12 and vice versa. By maintaining the artificial ambient pressure $P_2$ surrounding the variable area orifice 12, the effects of true ambient pressure $P_a$ changes (which occur, for example, with changes in altitude when the temperature control system is utilized for control of air temperature to the cabin of an aircraft) are greatly reduced as described in the above-mentioned application.

The servo actuator 8 also modulates the valve in duct 6 to reduce the shift in the set point of the temperature sensor 14 due to variations in the pressure $P_1$ of the source of servo fluid. While the above penumatic temperature control system is an advance in the accuracy of pneumatic temperature control systems, I have found that the system so described above can be further improved in terms of accuracy.

SUMMARY OF THE INVENTION

The object of the present invention is to provide an improved accuracy pneumatic temperature control system.

In accordance with the present invention, an increased accuracy pneumatic temperature control system is provided by biasing the pressure responsive servo actuator with the artificial ambient pressure $P_2$.

Referring to FIG. 2, it is seen that biasing the actuator is accomplished most easily by admitting the artificial ambient pressure $P_2$ into the vent space 18 between the two actuator areas 22 and 24, which heretofore has been exposed to the widely varying true ambient pressure $P_a$. In the figures, like numerals refer to like elements. It is seen that the pressure responsive servo actuator 8 now responds to the differential pressure between the servo pressure $P_s$ and the artificial ambient pressure $P_2$, as well as the pressure differential between the pressure $P_1$ of the source of servo fluid and the artificial ambient pressure $P_2$.

The advantage of so biasing the actuator can best be demonstrated by considering the weight flows of air through the variable area orifice 12 and the fixed orifice 20, and by examining the force balance on the actuator areas 22 and 24. In the following discussion these symbols are used:

$P_1$=the pressure of the source of servo fluid;
$A_{20}$=the area of fixed orifice 20;
$C_{20}$=discharge coefficient of fixed orifice 20;
$P_s$=the servo pressure admitted to the chamber 26 of pressure responsive servo actuator 8;
$A_{12}$=the area of variable area orifice 12;
$C_{12}$=discharge coefficient of variable area orifice 12;
$P_2$=the artificial ambient pressure $P_2$ maintained in chamber 10;
$A_{24}$=the area 24 of the auxiliary servo actuator 16 on which the pressures to which it responds act;
$A_{22}$=the area 22 of the pressure responsive servo actuator 8 on which the pressures to which it responds act;
$T_1$=the temperature of the source of servo fluid;
$F_s$=the force of spring 32; and
$K$=various constants.

For purposes of the following discussion, it is assumed that the flow through orifices 12 and 20 is sonic and that the fluid is air.

The weight flow across variable area orifice 12 is equal to:

(1)     $\dfrac{.53 C_{12} A_{12} P_s}{\sqrt{T_1}}$

The weight flow across fixed area orifice 20 is equal to:

(2)     $\dfrac{.53 C_{20} A_{20} P_1}{\sqrt{T_1}}$

Since the flows are equal, (3)     $C_{12} A_{12} P_s = C_{20} A_{20} P_1$

If $C_{12} = C_{20}$ then (4)     $A_{20}/A_{12} = P_s/P_1$

If $T_3$ remains constant, as desired, $A_{12}$ remains constant, and (5)     $A_{20}/A_{12} = K_1$ Therefore, (6)     $P_s/P_1 = K_1$ The artificial ambient pressure $P_2$ is maintained so that the absolute pressure ratio of $P_1$ and $P_2$ is a constant:

(7)     $P_2 = K_2 P_1$

Actuator areas $A_{22}$ and $A_{24}$ are fixed so that (8)     $A_{22} = K_3 A_{24}$ The actuator force tending to close valve 4 is:

(9) $$F_s + (P_1 - P_2)A_{24}$$

The actuator force tending to open valve 4 is:

(10) $$(P_s - P_2)A_{22}$$

Since the sum of the forces is equal to zero for equilibrium,

(11) $$F_s + (P_1 - P_2)A_{24} = (P_s - P_2)A_{22}$$

Substituting Equations 6, 7 and 8 into Equation 11 yields:

(12) $$F_s + (P_1 - K_2 P_1)A_{24} = (K_1 P_1 - K_2 P_1)K_3 A_{24}$$

Rearranging,

(13) $$\frac{F_s}{A_{24}} + (1 - K_2 - K_1 K_3 + K_2 K_3)P_1 = 0$$

$F_s/A_{24}$ may be made small with respect to the other terms in Equation 13, and, therefore, its effect is minimal. If there were no spring in the system,

(14) $$(1 - K_2 - K_1 K_3 + K_2 K_3)P_1 = 0$$

which equation would be independent of $P_1$ if the Expression $(1 - K_2 - K_1 K_3 + K_2 K_3)$ were equal to zero. Values of $K_1$, $K_2$, and $K_3$ can be chosen to make the expression within the brackets equal zero. (For example if $K_1 = 0.6$, $K_2 = 0.4$, and $K_3 = 3$, the expression is equal to zero.)

Therefore, the effect of $P_1$ is obviated and since the equation is independent of true ambient pressure $Pa$, its effect is also eliminated.

The foregoing and other objects, features and advantages of the present invention will become more apparent in the light of the following detailed description of the preferred embodiment thereof, as illustrated in the accompanying drawings.

DESCRIPTION OF THE PREFERRED EMBODIMENT

Figure 1:
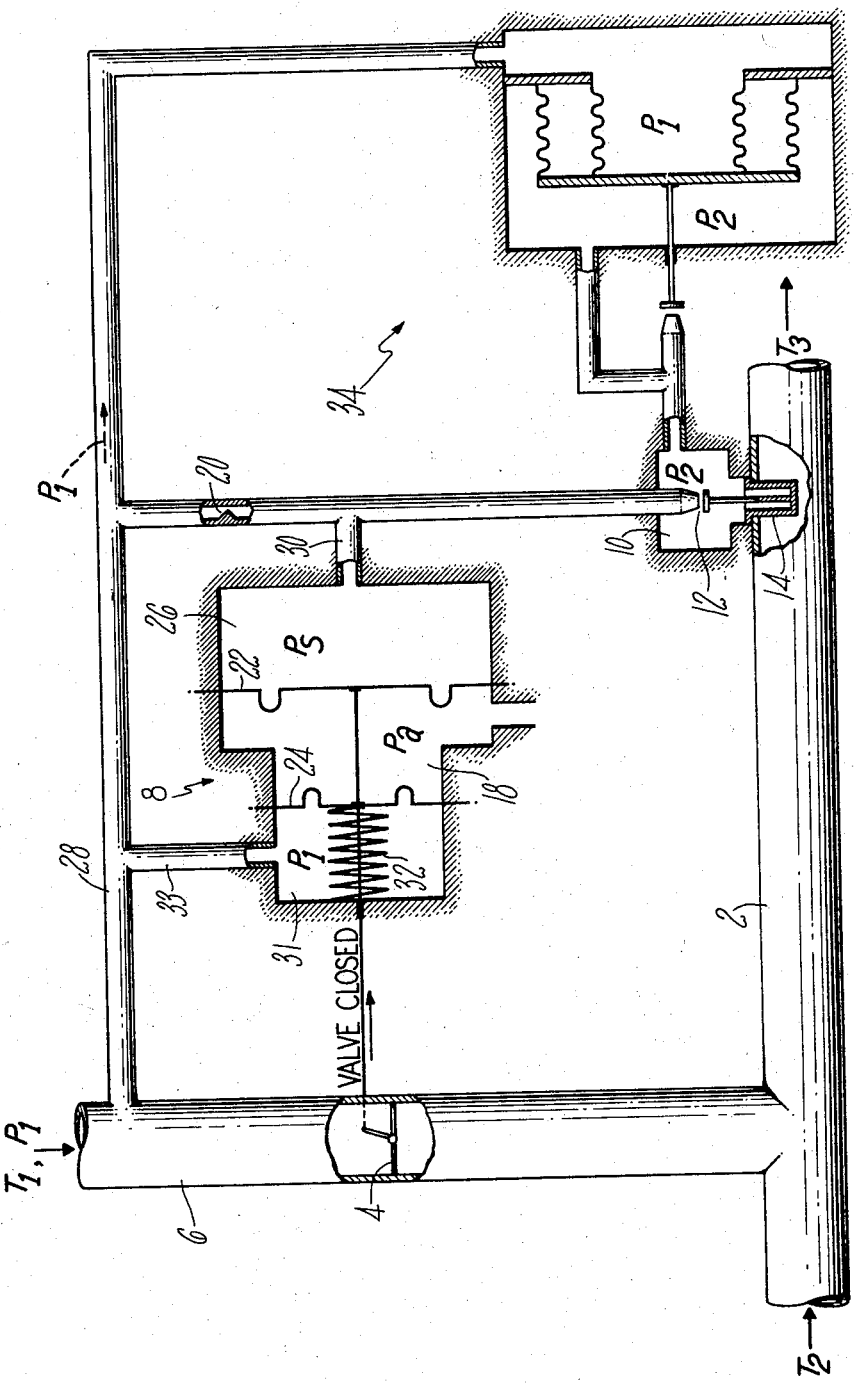
FIG. 1 is a schematic drawing of a pneumatic temperature control system as improved by the invention described and claimed in the above-mentioned application of E. W. Radtke.
Figure 2:
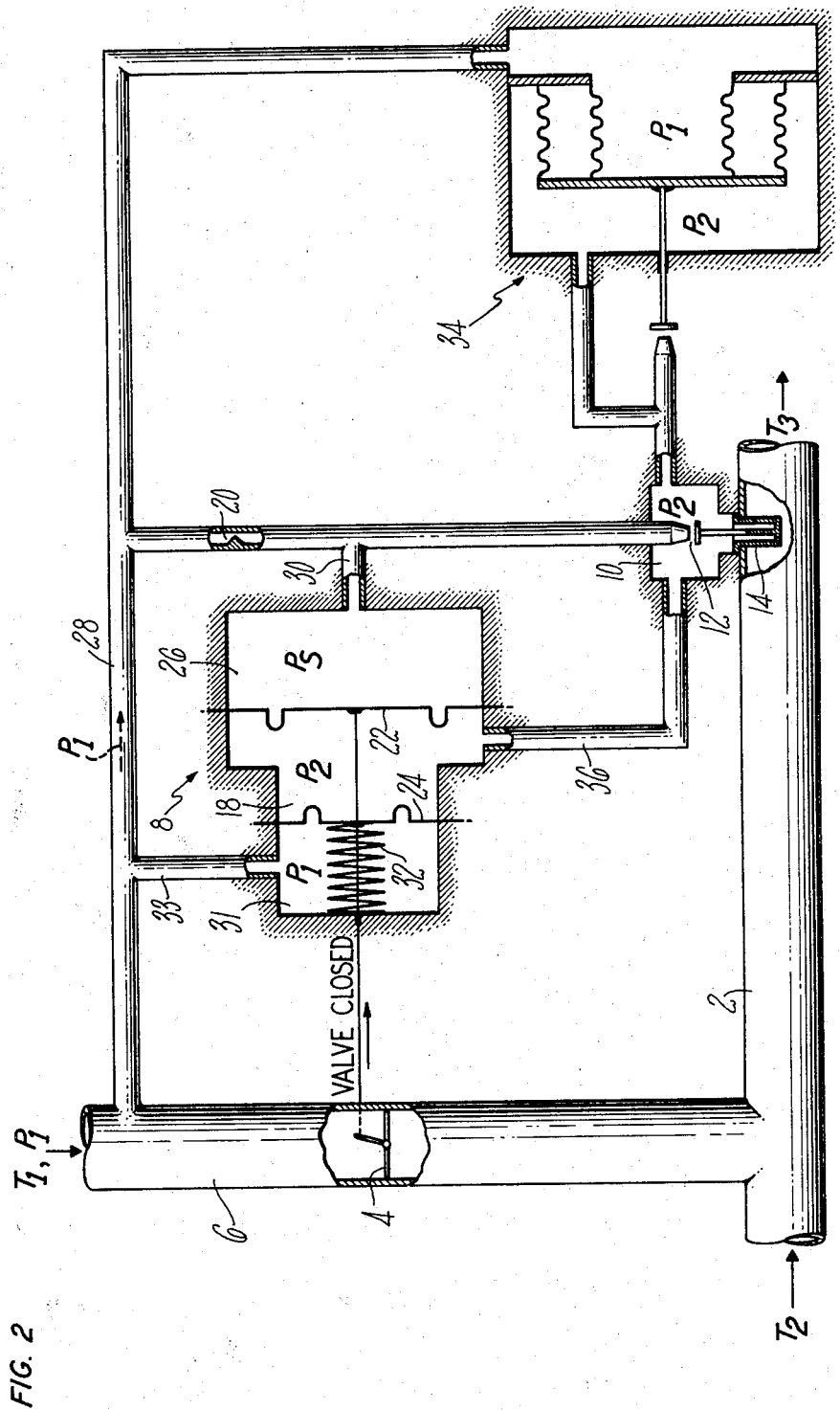
FIG. 2 is a schematic drawing of an exemplary embodiment of an improved accuracy pneumatic temperature control system in accordance with the present invention.

Referring now to FIG. 2, a first duct 2 connects a first source of fluid under pressure (not shown), which may be, for example, the outlet of an air conditioning system, to an aircraft cabin (not shown). A temperature sensor-transducer 14 is disposed in the first duct 2; the temperature sensor-transducer 14 may be any of those well known in the art, such as a bimetal type. A second duct 6 connects the first duct 2 with a second source of fluid under pressure (not shown). The second source of fluid may be at a higher temperature than the first source of fluid so that by mixing the two fluids in the proper amounts, a fluid of proper temperature will be admitted to, for example, an aircraft cabin. A valve 4, which may be of the butterfly type, is disposed in the second duct 6 for regulating the flow of fluid therethrough. A third duct 28 connects a source of servo fluid, which may be, for example, the second source of fluid, with a variable area orifice 12, the area of which orifice is varied by movement of the temperature sensor-transducer 14. Disposed in the third duct 28, is a fixed area orifice 20. A pressure responsive servo actuator 8 is provided for modulating the valve 4 and may be of the type, for example, having a first diaphragm 22 which is responsive to the pressure in the third duct 28 at a point between the variable area orifice 12 and the fixed area orifice 20; a line 30 connects the chamber 26 of the servo actuator 8 to the third duct 28 for that purpose.

The actuator 8 also is provided with a second diaphragm 24, which may be any one of several types known in the art such as a fixed area type having an area which is a percentage of the area 22 of diaphragm 22 and a spring 32, or a variable area type having a pressure responsive surface area 24 which is nominally a fixed percentage of the surface area 22. The diaphragm 24 is responsive to the pressure of the second source, $P_1$, and for convenience, chamber 31 of actuator 8 is shown connected via line 33 to the third duct 28, which in turn is connected to the second source of fluid. Chamber 10 is provided surrounding the variable area orifice 12, in which chamber an artificial ambient pressure $P_2$ is maintained, such that the ratio $P_1/P_2$ of the pressure $P_1$ of the source of servo fluid and the artificial ambient pressure $P_2$ is substantially constant. The means shown generally by numeral 34, for so maintaining the artificial ambient pressure will not be described herein. Reference is made to the patent application of Edward W. Radtke, supra, for a complete description thereof.

Line 36 connects chamber 10 with chamber 18, thus exposing chamber 18 to the artificial ambient pressure $P_2$.

The operation of the pneumatic temperature control system is the same as that disclosed by the above-mentioned patent application and reference is made thereto for an explanation thereof.

There has thus been described a preferred embodiment of an improved accuracy pneumatic temperature control system in accordance with my invention. It should be understood by those skilled in the art that various changes and omissions in the form and detail thereof may be made therein without departing from the spirit and scope of the invention, which is to be limited only as set forth in the following claims:

What I claim as new and desire to secure by Letters Patent of the United States is:

1. In combination with a pneumatic temperature control system for controlling the temperature of a fluid flowing through a duct of the type wherein a first duct is connected to a first source of fluid under pressure and a second duct interconnects a second source of fluid under pressure with the first duct, the second source of fluid having a temperature different from the first source of fluid; wherein a valve is disposed in the second duct for regulating the flow of fluid therethrough, the valve being modulated by a pressure responsive servo actuator responsive to the servo pressure in a third duct interconnecting a source of servo fluid with a variable area orifice, the variable area orifice being disposed within a chamber in which an artificial ambient pressure is maintained such that the ratio of the pressure of the source of servo fluid and the artificial ambient pressure is constant, the servo actuator also being responsive to the pressure of the source of servo fluid; and wherein a temperature sensor-transducer is disposed within said first duct downstream of the interconnection of the first and second ducts for varying the area of the variable area orifice in response to changes in temperature of the fluid sensed thereby, the improvement comprising:

biasing means for biasing said pressure responsive servo actuator with the artificial ambient pressure so that the pressure responsive servo actuator responds to the pressure differential between the servo pressure and the artificial ambient pressure, and to the pressure differential between the pressure of the source of servo fluid and the artificial ambient pressure.

2. A temperature control system as recited in claim 1, wherein said biasing means comprises:

housing means enclosing said pressure responsive servo actuator; and duct means connecting said housing means with the chamber in which the artificial ambient pressure is maintained so that a first pressure responsive area of said pressure responsive servo actuator is responsive to the pressure differential existent between the servo pressure and the artificial ambient pressure, and so that a second pressure responsive area of said pressure responsive servo actuator is responsive to the differential existent between the pressure of the source of servo supply and the artificial ambient pressure, whereby said valve is modulated in response to the movement of said first and second pressure responsive areas.

References Cited

UNITED STATES PATENTS 3,394,884   7/1968   Lord _____ 236—13

ROBERT A. O'LEARY, *Primary Examiner.*

WILLIAM E. WAYNER, *Assistant Examiner.*

U.S. Cl. X.R.

137—81; 236—85, 80